UNITED STATES PATENT OFFICE.

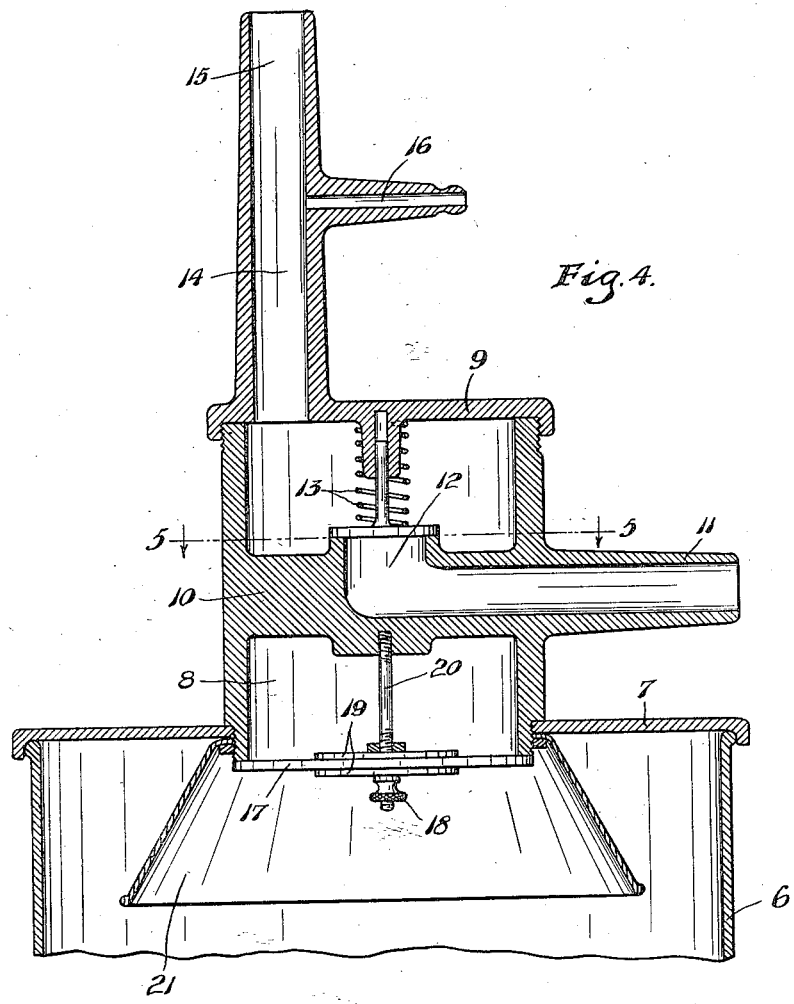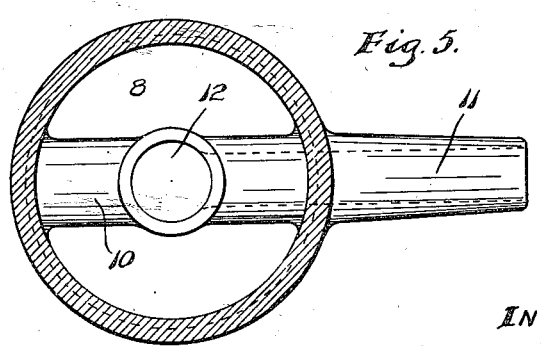

LAURITS DINESEN, OF MINNEAPOLIS, MINNESOTA, ASSIGNOR TO PERFECTION MANUFACTURING COMPANY, OF MINNEAPOLIS, MINNESOTA, A CORPORATION OF MINNESOTA.

MILKING APPARATUS.

1,261,780.  Specification of Letters Patent.  Patented Apr. 9, 1918.

Application filed September 17, 1917. Serial No. 191,752.

*To all whom it may concern:*

Be it known that I, LAURITS DINESEN, a citizen of the United States, residing at Minneapolis, in the county of Hennepin and State of Minnesota, have invented certain new and useful Improvements in Milking Apparatus; and I do hereby declare the following to be a full, clear, and exact description of the invention, such as will enable others skilled in the art to which it appertains to make and use the same.

My present invention relates to milking apparatus and, generally stated, has for its object to improve the operation and to simplify the construction of such apparatus.

Particularly, the invention relates to milking apparatus of the type wherein the milk pail or can is not subjected to vacuum or partial vacuum and wherein the milk is drawn into a milk chamber that is distinct from a milk pail or can and in which milk chamber the partial vacuum or pressure pulsations are produced. The advantage of this type of structure is that any suitable or ordinary milk pail or can may be used as the receptacle and a tight joint between the same and the cover is not required. As is well known, the other type of milking apparatus wherein the partial vacuum or pressure pulsations are produced in the milk pail or can, require the said milk pail or can to be of special construction and to have heavy and stiff walls and, moreover, require a packed joint and suitable clamps for securing the cover to the pail or can.

In practice, I have found that the only perfectly satisfactory form of teat cup is one wherein the same is provided with a rigid outer wall and an elastic inner wall or shell combined with means for causing expansion and contraction of the elastic shell, so as to closely approximate the hand milking action. Such a teat cup is disclosed in my prior Patent No. 1,072,584, of date, September 9, 1913, and a preferred form thereof is disclosed and claimed in my prior Patent, 1,201,808 of October 17, 1916.

My present invention is directed to an improved organization or combination whereof in teat cups of the above noted desirable character may be used in milking apparatus wherein, as above stated, the milk cans or pails are not subject to pressure pulsations or partial vacuum.

To the above ends, generally stated, the invention consists of the novel devices and combinations of devices hereinafter described and defined in the claims.

In the accompanying drawings which illustrate the invention, like characters indicate like parts throughout the several views.

Referring to the drawings;

Fig. 4 is a vertical section taken centrally through the upper portion of the milk can and through the milk chamber and immediately associated parts; and Fig. 5 is a horizontal section on the line 5—5 of Fig. 4, certain parts, which are below the said section line, being omitted.

Figure 1:
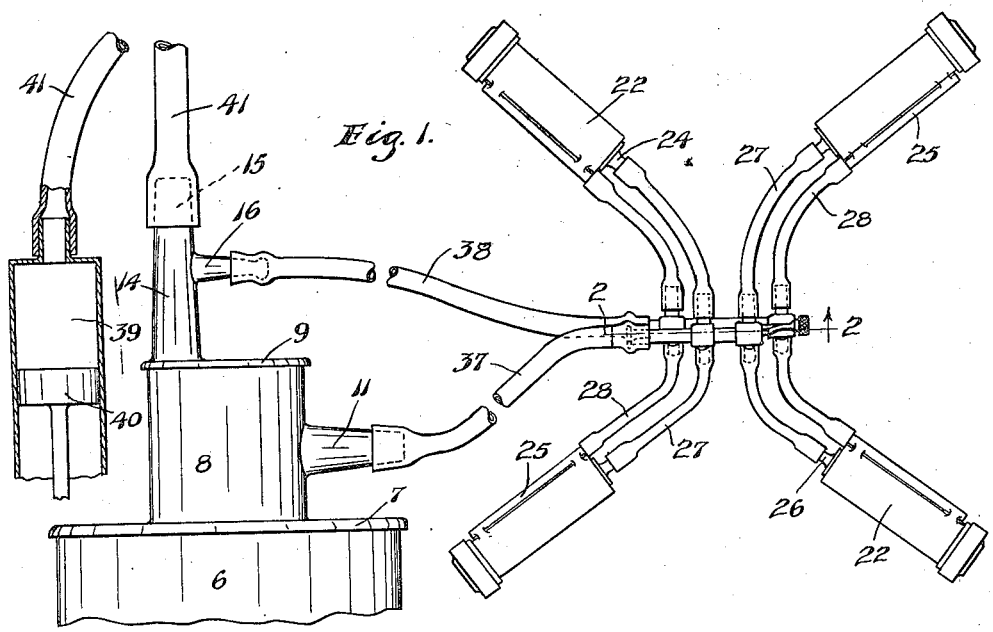
Figure 1 is a view partly in elevation and partly in diagram and with some parts broken away, illustrating my invention as applied in the manner above generally stated.
Figure 2:
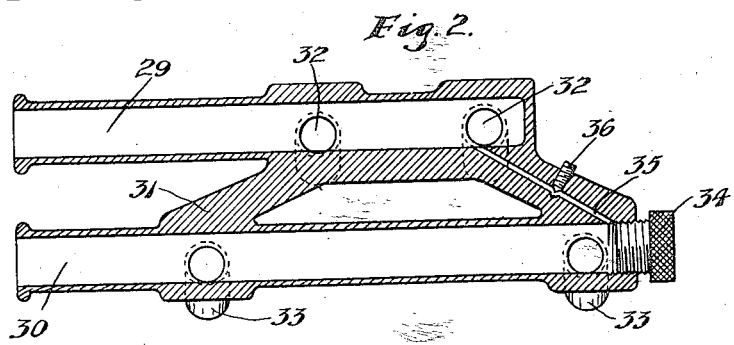
Fig. 2 is an enlarged section on the line 2—2 of Fig. 1.
Figure 3:
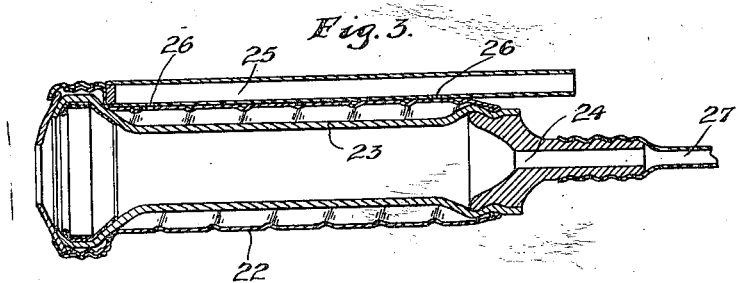
Fig. 3 is an enlarged horizontal section taken through the center of one of the teat cups shown in Fig. 1.

The milk can is indicated by the numeral 6 and, as stated, may be an ordinary thin wall can. The can cover 7 is preferably flanged to fit around the neck of the can, and this cover serves as a base or support for the so-called milk chamber 8, which latter, as shown, is a cast cylindrical structure provided with a removable cap 9 connected thereto by threaded engagement. The milk can chamber 8 is provided with a diametrically extended bar 10 which is projected radially at one side to form a tubular nipple 11. The passage through this tubular nipple 11 is extended into the bar 10, and thence, upward to form a milk delivery port 12 which is preferably at the axis of the milk chamber 8. This port 12 is normally closed by a downwardly spring-pressed check valve 13, the stem of which is seated in a guide on the cap 9. The cap 9 is formed with an upwardly extended tube 14 that terminates in a nipple 15 and has a laterally extended nipple 16.

The bottom of the milk chamber 5 opens through the cover or base 7 into the can 6, but is normally closed by a check valve preferably formed by a rubber disk 17 clamped by means of a nut 18 and washer 19 to the lower end of a supporting stem 20, the upper end of which stem is screwed into the central portion of the bar 10. Secured to the lower end of the milk chamber 8 and flaring downward therefrom, within the neck of the can 6 is a conical annular deflecting flange 21 which prevents the milk from being spattered against the cover and against the walls of the can adjacent to the cover.

In the teat cup illustrated, it is only necessary for the purposes of this case to particularly note the rigid outer wall 22, the tubular elastic inner wall or shell 23, a tubular nipple 24 that opens into one end of the said elastic shell 23, and an air tube 25, which, through lateral ports 26, opens into the otherwise closed annular chamber formed between the said shells 22 and 23.

Short flexible tubes or rubber hose sections 27 and 28 are connected at their outer ends, respectively, to the nipples 24 and to the ends of the air tubes 25. The said teat cups are connected in groups of four, preferably through a coupling head which comprises two tubular members 29 and 30 that are integrally connected by arms 31. The tube 29 has four nipples 32 and one of each of which is connected to the inner end of one of the flexible tubes 27. In a similar way, the tube 30 is provided with four nipples 33, to one of each of which is connected one of the flexible tubes 28. The extended end of the tube 30 is shown as closed by a threaded removable plug 34 which, when removed, permits a small hole or air duct 35 to be bored through one of the arms 31, so as to thereby afford a limited air communication between the two tubes 29 and 30. This air duct 35 is adapted to be opened or closed, more or less, by a threaded plug or choke valve 36.

The tube 29 is connected to the nipple 11 of the milk chamber 8 by means of a flexible tube or hose 37, and the tube 30 is connected to the nipple 16 by a flexible tube or hose 38.

Various means may be provided for producing pressure pulsations within the milk chamber 8, but for the purpose of illustration it may be assumed to be produced by a cylinder 39 and coöperating reciprocating piston 40, the pressure end of said cylinder being connected to the nipple 15 by a flexible hose or pipe 41. It may also be assumed that the cylinder and piston pump 39—40 is of the simple valveless form, so that when the piston is forced inward, an air pressure, or pressure slightly in excess of atmospheric pressure, will be produced in the milk chamber and when the said piston moves outward a partial vacuum or suction will be produced in the said milk chamber. However, as I have proved in practice, the apparatus will work satisfactorily where the pressure pulsations in the milk chamber are varied only from atmospheric pressure to the desired partial vacuum or suction.

The operation of the apparatus is substantially as follows.

When partial vacuum is produced in the milk chamber 8, partial vacuum will also be produced, both in the inner and outer chambers of the teat cups, and milk will be drawn through the milk tubes 27, 29 and 37 into the milk chamber 8. The lightly seated check valve 12, of course, freely opens to permit such flow. Also, at this time, the check valve 17 will, of course, be tightly seated against the lower end of the said milk chamber.

When air pressure, either atmospheric, or above atmospheric pressure is produced in the milk chamber, check valve 12 will be closed, so that the inner chambers of the teat cups will not thereby be relieved from partial vacuum, but at such time air will be forced through the air tubes 38, 30 and 28, into the annular outer chambers of the teat cups, thereby causing the elastic shells or tubes 23 to be contracted against the teats. This produces a very natural milking action and it will be noted that this squeezing of the teats is produced while they are still subject to more or less partial vacuum. It is sometimes desirable to give a slight release of the suction on the teats during the compressing or contracting action of the tubes 23, and this relief may be properly regulated by adjustment of the choke valve 36, so as to permit just the desired flow of air from the tube 29 into the tube 30. Also, when pressure is produced in the milk chamber 8, the milk accumulating therein under the previous suction stroke will be forced downward into the milk can. It will, of course, be understood that the flexible disk 17, will freely yield to permit this flow.

What I claim is:

1. In a milking apparatus, the combination with a teat cup having a flexible wall dividing the same into two chambers, of a milk chamber having a discharge passage equipped with a check valve, a milk conduit connecting one of the compartments of said teat cup to said milk chamber and equipped with a check valve, an air conduit connecting the other compartment of said teat cup to said milk chamber, and means for producing suction pulsations within said milk chamber.

2. In a milking apparatus, the combination with a teat cup having a flexible wall dividing the same into two chambers, of a milk chamber having in its bottom a discharge passage equipped with a check valve permitting a downward discharge for the milk into a can, a milk conduit connecting one of the compartments of said teat cup to said milk chamber and equipped with a check valve permitting a flow of milk into said milk chamber, a constantly open air conduit connecting the other compartment of said teat cup to said milk chamber, and means for producing suction pulsations within said milk chamber.

3. In a milking apparatus, the combination with a teat cup having a flexible wall dividing the same into two chambers, of a milk chamber having in its bottom a discharge passage equipped with a check valve permitting a downward discharge for the milk into a can, a milk conduit connecting one of the compartments of said teat cup to said milk chamber and equipped with a check valve permitting a flow of milk into said milk chamber, a constantly open air conduit connecting the other compartment of said teat cup to said milk chamber, means for producing suction pulsations within said milk chamber, and a can cover serving as a base of support for said milk chamber and through which the milk is delivered into the can.

4. In a milking apparatus, the combination with teat cups having tubular elastic walls dividing the same into central and surrounding annular chambers, of a can cover, a milk chamber supported on said can cover and having a milk discharge passage in its bottom, a check valve normally closing said milk discharge passage but permitting a discharge of milk from said chamber into the can, a milk conduit having branches connected to the central chambers of said teat cups, a check valve at the delivery end of said milk conduit permitting flow of milk into said chamber but checking a reverse flow, a contantly open air conduit connected to said milk chamber and having branches connected to the annular outer chambers of said teat cups, and means for producing suction pulsations within said milk chamber.

5. In a milking apparatus, the combination with a teat cup having a flexible wall dividing the same into two chambers, of a milk chamber having a discharge passage equipped with a check valve, a milk conduit connecting one of the compartments of said teat cup to said milk chamber and equipped with a check valve, an air conduit connecting the other compartment of said teat cup to said milk chamber, means for producing suction pulsations within said milk chamber, and a restricted air passage connecting said air and milk conduits.

6. In a milking apparatus, the combination with a teat cup having a flexible wall dividing the same into two chambers, of a milk chamber having a discharge passage equipped with a check valve, a milk conduit connecting one of the compartments of said teat cup to said milk chamber and equipped with a check valve, an air conduit connecting the other compartment of said teat cup to said milk chamber, means for producing suction pulsations within said milk chamber, a restricted air passage connecting said air and milk conduits, and provided with an adjustable choke valve for regulating the flow of air therethrough.

7. In a milking apparatus, the combination with a multiplicity of teat cups having flexible walls dividing the same into inner and outer chambers, of a coupling head comprising rigidly connected milk and air tubes connected by a restricted air passage, flexible branch tubes connecting the milk tube of said head to the inner chambers of the respective teat cups, flexible branch tubes connecting the air tube of said head to the outer chambers of the respective teat cups, a can cover, a milk chamber supported by said cover and having a discharge passage opening through the same, a check valve normally closing said milk discharge passage but permitting a discharge of milk therefrom, a milk conduit having a flexible section and connecting the milk tube of said head to the interior of said milk chamber, a check valve at the delivery end of said milk conduit permitting a flow of milk into said chamber but checking a reverse flow, an air conduit having a flexible section and connecting the air tube of said head to said milk chamber, and means for producing suction pulsations within said milk chamber.

In testimony whereof I affix my signature in presence of two witnesses.

LAURITS DINESEN.

Witnesses:
HARRY D. KILGORE,
BERNICE G. BAUMANN.